United States Patent [19]

Nishiyama et al.

[11] Patent Number: 4,569,880
[45] Date of Patent: Feb. 11, 1986

[54] REINFORCING ADHESIVE SHEET

[75] Inventors: Yukio Nishiyama; Kazuhiko Yamamoto; Munehiko Sanada, all of Osaka; Yukio Okada; Toshikatsu Miura, both of Kanagawa, all of Japan

[73] Assignees: Nitto Electric Industrial Co. Ltd., Osaka; Nissan Motor Company, Limited, Kanagawa, both of Japan

[21] Appl. No.: 725,200

[22] Filed: Apr. 19, 1985

[30] Foreign Application Priority Data

Apr. 19, 1984 [JP] Japan .................. 59-79626

[51] Int. Cl.⁴ ............ B32B 3/10; B32B 5/20
[52] U.S. Cl. .................... 428/212; 428/158; 428/188; 428/189; 296/188; 296/189
[58] Field of Search ........ 428/308.4, 188, 189, 428/158, 212; 296/188, 189

[56] References Cited

U.S. PATENT DOCUMENTS

| | | | |
|---|---|---|---|
| 3,306,967 | 2/1967 | Turkewitsch | 264/321 |
| 4,369,608 | 1/1983 | Miura | 428/31 |
| 4,378,385 | 3/1983 | Hughes | 427/58 |
| 4,378,395 | 3/1983 | Asoshina et al. | 428/189 |
| 4,444,818 | 4/1984 | Tominaga et al. | 428/215 |
| 4,451,518 | 5/1984 | Miura et al. | 428/189 |

Primary Examiner—William J. Van Balen
Attorney, Agent, or Firm—Sughrue, Mion, Zinn, Macpeak, and Seas

[57] ABSTRACT

A reinforcing adhesive sheet comprising: a thermosetting reinforcing resin sheet containing a reinforcing material in an unhardened or semi-hardened state; and a bead-forming material provided on the thermosetting reinforcing resin sheet, the bead-forming material being narrower than the thermosetting reinforcing resin sheet and forming a bead-like projection prior to hardening the thermosetting reinforcing resin sheet, wherein the bead-forming material is a flattened material produced by flattening an elastic foamed body containing a holding agent in voids thereof, the flattened form being maintained by the holding agent, and the bead-forming material is capable of recovering its original foamed form upon heating.

8 Claims, 5 Drawing Figures

REINFORCING ADHESIVE SHEET

FIELD OF THE INVENTION

The present invention relates to a reinforcing adhesive sheet.

BACKGROUND OF THE INVENTION

Heretofore, in the case of automotive vehicles, various reinforcing methods have been applied to steel plates which constitute the body thereof. For example, a plate comprising a metallic reinforcing material has been bonded to the inside of outer panels such as a roof, a fender, a hood, a trunk, a quarter panel and a door, which are relatively broad and have a flat form but have a thin thickness, by spot welding or with an adhesive, so that they have sufficient stiffness to withstand external forces exerted thereon. However, methods for reinforcing with such metallic reinforcing materials have various disadvantages, due to their heavy weight. For example, the weight of the outer panel, which is originally prepared so as to have a reduced thickness so as to decrease the weight of the vehicle body, is increased; also, the production costs are increased, and, furthermore, the steps for mounting such outer panels are complicated.

It is also known that in order to prevent vibration of the outer panels and also to reinforce them, polymeric materials such as asphalt rubber, an epoxy resin, an acryl resin, a phenol resin and an unsaturated polyester resin have been coated on or bonded to the back surface of the outer panels in a considerably large thickness and over a considerably large area. In this case, it is said that the stiffness is proportional to the cube of the thickness. Therefore, the stiffness of the outer panel can be increased by increasing the thickness of the coating. However, this method provides the same disadvantages as are encountered in the method for reinforcing with the metallic reinforcing material as described above, such as an increase in weight due to increasing the amount of the polymeric material, and an increase in production costs.

In view of these circumstances, U.S. Pat. Nos. 4,369,608, 4,378,385 and 4,444,818 have proposed reinforcing adhesive sheets which are lightweight and inexpensive that can greatly increase the stiffness of members to be reinforced.

Such reinforcing adhesive sheets comprise: (1) a thermosetting reinforcing resin sheet containing a reinforcing material in an unhardened or semi-hardened sheet; and (2) a bead-forming material bonded to the sheet (1), the material bring narrower than the sheet (1) and forming a bead-like projection prior to hardening the sheet (1), wherein portions of the sheet (1) extending beyond the bead-forming material (2) constitute adhesive surfaces of the reinforcing adhesive sheet to provide adherance to members to be reinforced.

The materials which can be used as the bead-forming materials are thermal recovering materials such as (a) a foamable resin sheet which expands upon heating to a temperature higher than the decomposition temperature of a foaming agent contained therein, (b) a flattened material which is prepared from a tubular material and which substantially recovers its original tubular form upon heating, and (c) a flattened material which is prepared from a non-tubular (e.g., rod- or film-shaped) material and which expands at least in a vertical direction upon heating, thereby substantially recovering its original non-tubular form.

The above flattened material prepared from a tubular or non-tubular material is produced by molding a thermoplastic polymer into a tubular form or a non-tubular form such as a rod-shaped form, preferably cross-linking the tubular or non-tubular material to provide a shape memory capability, and then flattened the material by techniques such as by passing the material through a hot press. The flattened material prepared from the tubular material is preferably designed so that a hot melt resin layer constitutes the inner surface, and this resin layer maintains the flattened state. The flattened material prepared from the non-tubular material is preferably such that the cross-linked film is stretched and the stretched film is fused to the sheet by means of, for example, a heat press.

A method of using the above-described reinforcing sheets can greatly improve the stiffness as compared with a method comprising bonding a sheet-like material having a uniform thickness and hardening the same. Such reinforcing adhesive sheets, however, have the following disadvantages.

Where the above-described foamable resin sheet is used as the bead-forming material, the shape of the foamed product obtained by heating the foamable resin sheet is not uniform, because the foaming pressure varies depending upon the heating temperature. This results in irregularities in the reinforcing effect. Further, since this method employs the technique that the foaming agent and resin are first kneaded and then molded into a sheet, it is difficult to use a foaming agent having a decomposition temperature of 120° C. or less from the standpoint of the production process. It is therefore necessary for the temperature for forming the bead-like projection to be at least 130° C., and preferably at least 140° C. For this reason, sufficient reinforcing effect cannot be obtained under low temperature hardening conditions of 120° C. or less.

Even where the flattened material prepared from the above-described flattened tubular or non-tubular material is used as the bead-forming material, the flattened material cannot sufficiently recover its original tubular or non-tubular form. In some cases, the recovered form varies depending upon the heating temperature. In particular, the recovering properties of the flattened material are not constant at low temperatures of 140° C. or less and at high temperatures of 200° C. or more. Thus, the reinforcing effect is irregular in such temperature ranges. Moreover, if the adhesion between the thermosetting reinforcing resin sheet and a member to be reinforced is increased, the original form cannot be completely recovered even though the appropriate heating temperature of from 140° to 200° C. is employed. This results in irregularities of the reinforcing effect.

Further, in order to recover the original tubular form of the flattened tubular material by heating the flattened material, a method has been employed, comprising treating the tubular material with electron beams and the like to increase the crosslinking density of the tubular material. If this treatment is not conducted, the flattened tubular material does not well recover its original tubular form.

However, this treatment is very difficult. For instance, if the treatment is insufficient, the flattened material does not recover its original form sufficiently, and if the treatment is conducted to excess, the tubular material becomes hard and it is difficult to flatten the tubular material. In addition, since the reinforcing adhesive sheet obtained using such a tubular material also becomes hard, it is difficult for the reinforcing adhesive sheet to sufficiently conform to a member to be reinforced having a curved surface and as a result, a sufficient reinforcing effect cannot be obtained.

Thus, it is recently difficult to mass-produce the tubular type material inexpensively and in the stable manner.

SUMMARY OF THE INVENTION

The present invention is intended to overcome the above-described problems.

An object of the present invention is to provide a reinforcing adhesive sheet which is lightweight, inexpensive, and greatly increses the stiffness of the member to be reinforced without causing irregularities in the reinforcing effect.

The reinforcing adhesive sheet according to the present invention which achieves this object of the invention comprises:

a thermosetting reinforcing resin sheet containing a reinforcing material in an unhardened or semi-hardened state; and a bead-forming material provided on the thermosetting reinforcing resin sheet, the bead-forming material being narrower than the thermosetting reinforcing resin sheet and forming a bead-like projection prior to hardening the thermosetting reinforcing resin sheet, wherein the bead-forming material is a flattened material produced by flattening an elastic foamed body containing a holding agent in voids thereof, the flattened form being maintained by the holding agent, and the bead-forming material is capable of recovering its original foamed form upon heating.

DETAILED DESCRIPTION OF THE INVENTION

The reinforcing adhesive sheet of the present invention is applied to the back of a member to be reinforced in such a manner that the bead-forming material is interposed between the thermosetting reinforcing resin sheet and the member to be reinforced; that is, exposed areas of the thermosetting reinforcing resin sheet which remain uncovered with the bead-forming material are bonded to the back of the member to be reinforced. By heating the reinforcing ahdesive sheet thus bonded, the holding agent contained in the voids of the bead-forming material softens or melts and its holding ability maintaining the elastic foamed body in the flattened form is removed. As a result, the elastic foamed body is released from the flattened form and recovers its original form. The capability of the bead-forming material of the present invention to recover its original form is greater than that of conventional flattened material prepared from the tubular or non-tubular material. This great capability to recover the original form pushes up the softened thermosetting reinforcing resin sheet until the flattened material recovers the original foamed body form. In this state, the thermosetting reinforcing resin sheet is further heated and hardened to form the bead-like projection.

The bead-like projection can be shaped in any desired form since the flattened material completely recovers its original foamed body form as described above. Because of this complete and uniform recovery, there is no irregularity in the reinforcing effect of the reinforcing adhesive sheet of the present invention. Thus, the reinforcing adhesive sheet of the present invention always greatly increases the stiffness of the member to be reinforced.

The temperature at which the flattened material starts to recover its original form can be set at any desired level by appropriately selecting the type of the holding agent contained in the flattened material. Furthermore, the recovery speed is high so that the types of thermosetting reinforcing resin sheets which can be used can be expanded. For example, the flattened material can completely recover its original form at temperatures of 100° C. or less by appropriately selecting the type of the holding agent, and as a result, a reinforcing adhesive sheet which can exhibit the reinforcing effect even when used at low temperatures of 100° C. or less can be produced.

Thus, the reinforcing adhesive sheet according to the present invention comprises the thermosetting reinforcing resin sheet containing a reinforcing material, in an unhardened or semi-hardened state, and the bead-forming material comprising the flattened material produced from the foamed body which can recover its original foamed form.

According to a preferred embodiment of the reinforcing adhesive sheet of the present invention, the thermosetting reinforcing resin sheet comprises a first thermosetting reinforcing resin sheet containing the reinforcing material and the second thermosetting reinforcing resin sheet, with the bead-forming material attached to one side of the first thermosetting reinforcing resin sheet, and the second thermosetting reinforcing resin sheet is laminated on the first thermosetting reinforcing resin sheet so as to interpose the bead-forming material therebetween. That is, the reinforcing adhesive sheet has the structure such that the bead-forming material is interposed between the first and second thermosetting reinforcing resin sheets.

By using the reinforcing adhesive sheet having the structure described above, the whole surface of the second thermosetting reinforcing resin sheet is effectively bonded to the member to be reinforced, and thus the reinforcing adhesive sheet is applied more firmly to the member. Even if the bead-forming material pushes up the first thermosetting reinforcing resin sheet to form a gap therebetween, the surface of the member to be reinforced to which the reinforcing adhesive sheet has been applied is never exposed to the outside because the second thermosetting reinforcing resin sheet remains in close contact with the member. For this reason, the formation of rust in the member can be prevented efficiently.

The first and second thermosetting reinforcing resin sheets each comprises a thermosetting resin composition exhibiting high adhesion, particularly to a metallic plate. The tensile modulus and glass transition temperature of the hardened resin sheet vary greatly, mainly depending upon the resin composition, i.e., the type and amount of the base resin, curing agent, and other components.

In the first place, the present inventors prepared a resin composition so as to have a sufficiently high tensile modulus to increase the stiffness of the metallic plate (such as the outer panel of the vehicle body) and also to have a high glass transition temperature, and reinforced a metallic plate using such composition. The effect of the resin composition in reinforcing the metallic plate is satisfactory, but deformation of the metallic plate due to hardening and shrinkage of the resin composition inevitably occurred, the extent depending on the type and thickness of the metallic plate. Further, the present inventors prepared a resin composition designed so that the tensile modulus was insufficient to increase the stiffness of the metallic plate and the glass transition temperature was low, and reinforced the metallic plate using the composition. In reinforcement of the metallic plate with this resin composition, deformation of the metallic plate due to the hardening and shrinkage of the resin composition was not substantially observed. However, depending on the type and thickness of the metallic plate, the desired reinforcing effect could not always be obtained.

The above problem can be easily overcome by using the first and second thermosetting reinforcing resin sheets in combination with each other, the first thermosetting reinforcing resin sheet is a sheet in which a reinforcing material is embedded and which when hardened by heating has a high tensile modulus and a high glass transition temperature, and the second thermosetting reinforcing resin sheet is a sheet which is laminated on the first sheet and when hardened by heating has a low tensile modulus and a low glass transition temperature. That is, in the reinforcing adhesive sheet according to the preferred embodiment of the present invention, the first thermosetting reinforcing resin sheet serves to increase the stiffness of the metallic plate because after hardening by heating, the sheet has a high tensile modulus and a high glass transition temperature, and the second thermosetting reinforcing resin sheet serves to prevent the development of strain in the metallic plate, because after hardening by heating, the tensile modulus is small and the glass transition temperature is low.

In the reinforcing adhesive sheet according to the preferred embodiment of the present invention, the first thermosetting reinforcing resin sheet as described above is such that after hardening by heating, the tensile modulus is sufficiently high to increase the stiffness of the metallic plate, and the glass transition temperature is high. In general, the tensile modulus is from about 50 to 500 kg/mm² and the glass transition temperature is at least about 80° C. If the tensile modulus is too high or the glass transition temperature is too high, it is likely that the development of strain cannot be prevented, depending, of course, on the particular type, thickness, and shape of the metallic plate irrespective of the presence of the second thermosetting reinforcing resin sheet.

Tensile modulus as referred to herein is measured by the method defined in ISO Recommendation R-527 using a test piece of Type 1 at Speed B.

On the other hand, the second thermosetting reinforcing resin sheet is designed such that the tensile modulus after hardening by heating is not sufficiently high to increase the stiffness of the metallic plate and the glass transition temperature is low. In general, the tensile modulus is from about 0.1 to 30 kg/mm² and the glass transition temperature is about 70° C. or less. If the tensile modulus is too low or the glass transition temperature is too low, the reinforcing effect is decreased, the extent depending on the type, thickness, and shape of the metallic plate.

In a more preferred embodiment of the present invention, the first thermosetting reinforcing resin sheet of the reinforcing adhesive sheet has a two-layer structure. That is, the first thermosetting reinforcing resin sheet comprises two layers: an inner layer coming into contact with the bead-forming material and an outer layer, and the outer layer is designed such that the tensile modulus after hardening by heating is greater than those of the inner layer and the second thermosetting reinforcing resin sheet, and the glass transition temperature after hardening by heating is higher than those of the inner layer and the second thermosetting reinforcing resin sheet.

In this more preferred embodiment, as the same as in the above-described preferred embodiment, the outer layer of the first thermosetting reinforcing resin sheet serves to increase the stiffness of the metallic plate, and the inner layer and the second thermosetting reinforcing resin sheet prevent the development of strain in the metallic plate. The second thermosetting reinforcing resin sheet, the entire surface of which is bonded to the metallic plate, serves to prevent the formation of rust in the metallic plate. In addition, the second thermosetting reinforcing resin sheet increases the adhesion area, thereby enhancing the adhesion between the reinforcing adhesive sheet and the metallic plate.

The tensile modulus of the outer layer of the first thermosetting reinforcing resin sheet after hardening by heating is from 50 to 500 kg/mm², and the tensile modulus of the inner layer of the first thermosetting reinforcing resin sheet and the second thermosetting reinforcing resin sheet is from 0.1 to 30 kg/mm². The glass transition temperature after hardening by heating is at least 80° C. for the outer layer of the first thermosetting reinforcing resin sheet, and 70° C. or less for the inner layer of the first thermosetting reinforcing resin sheet and the second thermosetting reinforcing resin sheet.

When the reinforcing adhesive sheet is applied to the metallic plate and then is subjected to electro-deposition coating, the metallic plate remains uncoated with the paint around the periphery of the adhesive sheet and rust tends to be developed in these uncoated areas. This development of rust can be inhibited by rendering the second thermosetting reinforcing resin sheet, or both the second thermosetting reinforcing resin sheet and the inner layer of the first thermosetting reinforcing resin sheet, electrically conductive. This is more effective in the prevention of rust.

In both the first and second thermosetting reinforcing resin sheets, an epoxy resin is most preferably used as the thermosetting resin. To this epoxy resin, a heat-active hardener is added, and, if desired, other various additives are added, and the resulting mixture is molded into a sheet in an unhardened or semi-hardened state by a conventional method such as various coaters (e.g., roll coater, bar coater, etc.), extrusion method, heat press method, and the like. Of course, thermosetting resins other than the epoxy resin can be used. The tensile modulus and glass transition temperature after hardening by heating of each of the first and second thermosetting reinforcing resin sheets can be controlled within the above-specified ranges by appropriately selecting the type of each of the epoxy resin, the hardener, and other additives, or the amount of each component added.

Various types of epoxy resins can be used in the present invention, and the examples thereof include the conventional glycidyl ether-, glycidyl ester-, glycidylamine-, linear aliphatic epoxide-, and alicyclic epoxide-type epoxy resins. In preparation of each sheet, these epoxy resins can be used alone or in combination with each other depending on the necessary and desired physical properties of the sheet.

As heat-active hardeners, the conventional hardeners exhibiting a hardening action upon heating can be used. In general, they are sufficient to be active within the temperature range of from 80° C. to 200° C. Typical examples of these hardeners are dicyandiamide, 4,4'-diaminodiphenylsulfone, imidazole derivatives such as 2-n-heptadecylimidazole, isophthalic acid dihydrazide, N,N-dialkylurea derivatives, and N,N-dialkylthiourea derivatives. The amount of the hardener used is generally from 1 to 15 parts by weight per 100 parts by weight of the epoxy resin.

In addition to the hardener, if desired and necessary, various additives may be added to provide the composition with a cohesive force to an extent that sheet molding becomes possible, to prevent sagging, and to lower the melt viscosity to increase the wettability.

For example, to increase the sheet moldability, thermoplastic resins such as polyvinyl butyral, polyamide, polyamide derivatives, polyester, polysulfone, polyketone, and high molecular weight epoxy resins derived from bisphenol A and epichlorohydrin, and a butadiene/acrylonitrile copolymer or its derivatives can be added. The amounts of the resin added is generally from about 5 to 100 parts by weight per 100 parts by weight of the thermosetting resin.

Further, to prevent the composition from sagging, fillers such as calcium carbonate, talc, asbestos, silicates, carbon black, colloidal silica, clay, glass, and short fibers such as vinylon can be used.

Moreover, to provide electrical conductivity to the second thermosetting reinforcing resin sheet or both the second thermosetting reinforcing resin sheet and the inner layer of the first thermosetting reinforcing resin sheet, metal powder (such as iron powder and aluminum powder), graphite powder, or the like is used in the preparation of the sheets. The amount of the powder added is generally from about 10 to 300 parts by weight per 100 parts by weight of the epoxy resin.

In addition, to lower the melt viscosity and increase wettability, reactive diluents such as butyl glycidyl ether and long chain alcohol monoglycidyl ether, phthalic acid-based plasticizers such as dioctyl phthalate, and phosphoric acid-based plasticizers such as tricresyl phosphate can be added. The amount of the reactive diluent or plasticizer added is generally from about 5 to 30 parts by weight per 100 parts by weight of the thermosetting resin.

Of the first and second thermosetting reinforcing resin sheets, it is particularly preferred for the second thermosetting reinforcing resin sheet to have good adhesion properties at normal conditions because such good adhesion properties facilitate temporary adhesion of the reinforcing adhesive sheet prior to hardening by heating in its application to the metallic plate. Of course, the first thermosetting reinforcing resin sheet also has good adhesion properties. Particularly, in the case that the second thermosetting reinforcing resin sheet is narrower than the first thermosetting reinforcing resin sheet, it is preferred for the first thermosetting reinforcing resin sheet to have good adhesion properties. When the first thermosetting reinforcing resin sheet has a two-layer structure, it suffices that only the inner layer has good adhesion properties.

The reinforcing material is embedded in the first thermosetting reinforcing resin sheet to increase the effect of reinforcing the metallic plate. When the first thermosetting reinforcing resin sheet has a two-layer structure, the reinforcing material is preferably embedded in the outer layer.

Reinforcing materials which can be used include inorganic fabrics made of glass fibers, asbestos fibers, etc., organic fabrics made of flax, cotton, nylon, polyester, polypropylene, etc., films of polyester, nylon, etc., papers such as kraft paper, unwoven fabrics of polyester fibers, polypropylene fibers, etc., and foils of aluminum, iron, copper, zinc, etc.

In producing the first thermosetting reinforcing resin sheet with the reinforcing material embedded therein, one or both sides of the reinforcing material are coated or impregnated with the thermosetting resin composition. Of the above-described reinforcing materials, inorganic fabrics are preferred in that they can produce a sufficiently high reinforcing effect even in the case of one side-impregnation. A glass fiber fabric is particularly preferred.

The thickness of the first and second thermosetting reinforcing resin sheets vary depending on the type of the metallic plate, the degree of reinforcement, and so forth. In general, the thickness of the first thermosetting reinforcing resin sheet is from about 0.2 to 40 mm, and preferably from 0.5 to 20 mm. In the case that the first thermosetting reinforcing resin sheet has the two-layer structure, the thickness of the outer layer is from about 0.01 to 10 mm, and preferably from 0.1 to 5 mm, the thickness of the inner layer is from 0.1 to 30 mm, and preferably from 0.5 to 10 mm, and the total thickness of the inner and outer layers is from about 0.2 to 40 mm, and preferably from 0.5 to 20 mm. The thickness of the second thermosetting reinforcing resin sheet is from about 0.1 to 30 mm, and preferably from 0.5 to 10 mm.

The bead-forming material, which is the other important element of the reinforcing adhesive sheet of the present invention, is a flattened foamed material which can recover its original form and which is produced by introducing a holding agent in voids of an elastic foamed material, flattening the elastic foamed material in the state that the holding agent is softened or melted, and then solidifying the holding agent while maintaining the flattened state.

The elastic foamed material which can be used is such that in spite of whether or not a polymeric material constituting the foamed material has self-elasticity, the foamed material can be compression deformed upon application of an external force, and, when the external force is removed, can recover its original form.

The elastic foamed material preferably has an open cell structure which can introduce the holding agent into the voids and facilitates flattening of the foamed material. In addition, the elastic foamed material may have partially closed cell structure so long as the holding agent can be introduced into the voids to an extent such that the flattened state can be maintained.

The apparent density of the foamed material is generally about 0.5 g/ml or less, and the lower limit thereof is about 0.005 g/ml. The apparent density is preferably in the range of from 0.015 to 0.5 g/ml. If the apparent density is too high, even if the foamed material is flattened, reduction in the volume is small. Moreover, since the volume of the voids is small, the holding agent cannot be introduced thereinto in a sufficient amount to maintain the flattened state. On the other hand, if the apparent density is too small, the capability of the flattened material to recover its original form is reduced.

The thickness of the elastic foamed material is generally from about 2 to 50 mm and preferably from 4 to 20 mm.

The elastic foamed material can be produced using various polymers by conventional methods. Various polymers can be used so long as they can produce an elastic foamed material having the above-described capabilities. Examples of polymers which can be used include polyethylene, polypropylene, an ethylene/vinyl acetate copolymer, polyurethane, and rubber.

The holding agent is a resin which softens or melts upon heating and solidifies upon cooling. It is necessary for the holding agent to have a melting point or softening point lower than that of the foamed material. If the melting point or softening point of the holding agent is higher than that of the foamed material, cells of the foamed material collapse in solidifying the holding agent to maintain the foamed material in the flattened state, and also in heating the flattened material to release the holding ability from the holding agent. Thus, even if the holding ability is removed, the flattened foamed material cannot recover its original form, and the objects of the present invention cannot be attained.

It is preferred for the melting point or softening point of the holding agent to be at least about 10° C. higher then room temperature (about 20° C.). The preferred melting point or softening point is in the range of from 40° to 140° C. If the melting point or softening point is too low, the flattened foamed material tends to recover its original foamed form during storage before use. On the other hand, if it is too high, the foamed material must be flattened at high temperatures; thus, during this heating process, the foamed material generally undergoes thermal deterioration and cannot recover its original form.

Various resins can be used as the holding agents so long as they have a melting point or softening point falling within the above-specified range. Of these resins, low molecular weight resins having a narrow melting point or softening point range are preferred in that the viscosity abruptly drops by heating and the original form is recovered quickly. Examples of the resins which can be used as the holding agents are thermosetting resins such as an epoxy resin, a phenol resin, and a polyester resin, and thermoplastic resins such as polyethylene, polypropylene, polyamide, and polybutyral. Various additives such as plasticizers and fillers can be added to the above resins to control the viscosity at the time of melting or to decrease the production costs.

Thermosetting resin/hardener mixtures can be used as the holding agents. In this case, the flattened foamed material recovers its original form by heating and the holding agent hardens in the state that the original form is recovered. Thus, the hardness and strength of the foamed material which has recovered its original form can be controlled and the reinforcing effect can be increased. Hardeners which can be used for this purpose are compounds which do not harden at temperatures at which the foamed material is flattened and which can harden the resins at temperatures not exerting adverse influences on the shape of the foamed material recovered its original form.

The holding agent can be introduced into the voids of the elastic foamed material by various procedures: a method comprising impregnating the foamed material with a solution of the holding agent in a suitable solvent and then removing the solvent, a method comprising wiping the foamed material with the holding agent or vibrating the foamed material to introduce the holding agent, and a method comprising impregnating the foamed material with a molten holding agent.

The amount of the holding agent introduced into the voids of the foamed material is generally from about 25 to 75 wt% based on the total amount of the elastic foamed material and the holding agent. The amount can be determined appropriately within the above-specified range so that the flattened state can be maintained. For example, in the case of a polyurethane foamed material having an apparent density of 0.02 and a thickness of 10 mm, the amount of the holding agent added is generally from about 70 to 1,500 g/m$^2$.

In accordance with the present invention, the elastic foamed material containing the holding agent in the voids thereof is flattened and this flattened state is maintained by the action of the holding agent.

In flattening the foamed material, the foamed material containing the holding agent is heated to a temperature at which the holding agent softens or melts, the foamed material is flattened, and the holding agent is solidified while maintaining the foamed material in the flattened state. It is not always necessary for the above temperature to be higher than the melting point of the holding agent so long as the holding can be attained, but the temperature must be a temperature at which the foamed material does not soften or melt. More specifically, the following flattening procedures are typical: a method in which the foamed material is flattened at a temperature near the melting point or softening point of the holding agent by means of a heating press and then cooled in this flattened state (in this case, a cooling step is not required depending on the temperature of the heating press, and, in some cases, it is sufficient that the flattened foamed material is taken out of the press), and a method in which the foamed material is heated and then immediately flattened by means of a cooling roll.

The reinforcing adhesive sheet of the present invention is produced by applying the bead-forming material to one side of the first thermosetting reinforcing resin sheet (the inner layer in the case of two-layer structure) in such a manner that the bead-forming material has a width narrower than that of the first thermosetting reinforcing resin sheet. In a preferred embodiment, the reinforcing adhesive sheet is produced by further laminating the second thermosetting reinforcing resin sheet in such a manner that it covers the above sheet, and then bonding them together.

In the reinforcing adhesive sheet of the present invention, a protective film may be provided on the opposite side of the first thermosetting reinforcing resin sheet opposite to the side thereof to which the flattened material is attached.

This protective film has the following effects.

(1) When the reinforcing adhesive sheet with the protective film provided thereon is stored in a wound form prior to practical use, the protective film serves as a separator, thereby preventing problems such as sheet to sheet sticking. In reinforcing the outer panel of the door, for example, the reinforcing adhesive sheet with the protective film provided thereon is applied without separation of the protective film and a peeling operation is not necessary. Thus, the reinforcing operation is speeded up.

(2) Since the protective film is applied to the outer panel as a reinforcing element, it is expected that the reinforcing effect is further improved. Moreover, since the protective film is applied so as to cover the entire surface of the first thermosetting reinforcing resin sheet, it improves the moisture proofness of the reinforcing adhesive sheet and prevents a reduction in the reinforcing effect with a lapse of time. Thus, a reinforcing layer of high reliability can be formed.

The protective film can be produced by molding a polymeric material having the above-described capabilities and excellent strength, moisture proofness, heat resistance, etc., in a thickness of from 0.01 to 0.5 mm, and preferably from 0.03 to 0.1 mm. Various polymeric materials can be used for this purpose. Examples thereof include polyester, polyethylene, nylon, polyvinyl chloride, polypropylene, and an ethylene/vinyl acetate copolymer.

The preferred embodiment of the reinforcing adhesive sheet of the present invention is such that the first thermosetting reinforcing resin sheet or the first and second thermosetting reinforcing resin sheets do not substantially flow and have self-supporting properties at room temperature, but as a whole, the reinforcing adhesive sheet is in a high viscosity condition. The reinforcing adhesive sheet possesses flexibility and softness. Even upon bending at an angle of from 250° to 300° C., the sheet is not damaged and can recover its original form. Because of these desirable properties, the reinforcing adhesive sheet can readily conform to the shape of the member to be reinforced; that is, the sheet can ba applied to members having curved shapes, such as wave-like, convex, rectangular, and concave forms.

Figure 1:
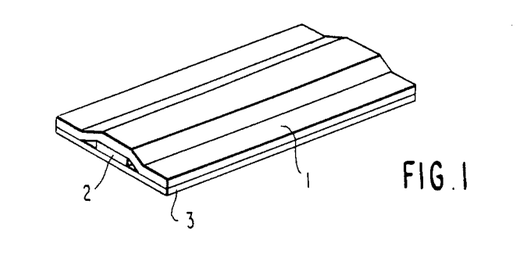
FIG. 1 is a perspective view of a reinforcing adhesive sheet according to an embodiment of the present invention.
Figure 2:
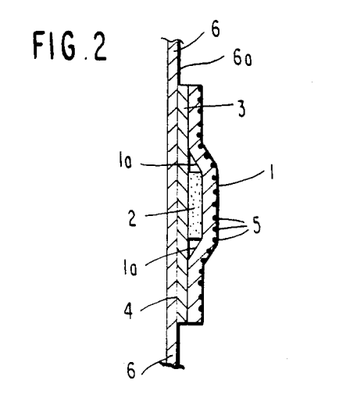
FIG. 2 is a cross-sectional view of the reinforcing adhesive sheet of FIG. 1 which is applied to a metallic plate prior to heating.

FIGS. 1 and 2 show a reinforcing adhesive sheet of the present invention. In the figures, 1 indicates a first thermosetting reinforcing resin sheet containing a reinforcing material 5 in an unhardened or semi-hardened state; 2 indicates a bead-forming material, i.e., a flattened material, which is attached to the sheet 1 and is narrower than the sheet 1; and 3 indicates a second thermosetting reinforcing resin sheet laminated on the first sheet 1 in such a manner that it covers the bead-forming material 2, which is bonded to a surface 4 of a member to be reinforced.

Figure 3:
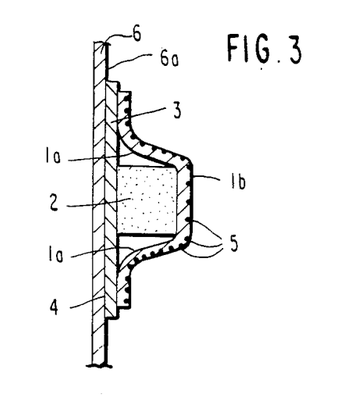
FIG. 3 is a cross-sectional view of the reinforcing adhesive sheet and metallic plate of FIG. 2 after heating.

The reinforcing adhesive sheet is applied to an outer panel of a vehicle door as shown in FIG. 3. That is, the second thermosetting reinforcing resin sheet 3 is bonded to the back 6a of the outer panel 6. When the reinforcing adhesive sheet is heated, its viscosity temporarily drops and the reinforcing adhesive sheet is brought into closer contact with the outer panel 6. At the same time, the bead-forming material 2 recovers its original form. As a result, the first thermosetting reinforcing resin sheet 1 is pushed up from the second thermosetting reinforcing resin sheet 3 from surfaces 1a—1a, thereby forming a bead-like projection 1b. When the reinforcing adhesive sheet is further heated, the first and second thermosetting reinforcing resin sheets 1 and 3 are hardened, resulting in the formation of the structure shown in FIG. 3.

Figure 4:
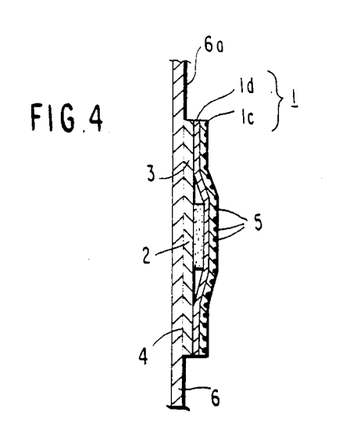
FIGS. 4 and 5 each is a cross-sectional view of a reinforcing adhesive sheet according to other embodiments of the present invention illustrated as applied to a metallic plate prior to heating.
Figure 5:
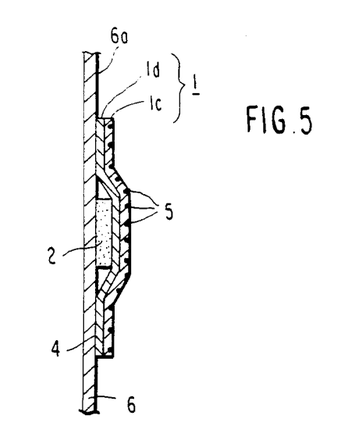

FIGS. 4 and 5 show other embodiments of the reinforcing adhesive sheet of the present invention. The adhesive sheet shown in FIG. 4 has the same structure as in the adhesive sheet of FIG. 1, except that the first thermosetting reinforcing resin sheet 1 containing the reinforcing material, in the unhardened or semi-hardened state, comprises an outer layer 1c having embedded therein a reinforcing material 5 and having the resin composition which is formulated such that when the sheet is applied to a metallic plate 6 and hardened by heating, the tensile modulus is sufficient to increase the stiffness of the metallic plate and also the glass transition temperature is raised; and an inner layer 1d in which the tensile modulus is insufficient to increase the stiffness of the metallic plate and the glass transition temperature is lowered. The adhesive sheet shown in FIG. 5 has the same structure as in the sheet of FIG. 4, except that the second thermosetting reinforcing resin sheet is omitted.

As the preferred embodiment of FIG. 2, the second thermosetting reinforcing resin sheet 3 is formulated such that the tensile modulus after hardening by heating is smaller than that of the first thermosetting reinforcing resin sheet 1, and the glass transition temperature is lower than that of the first thermosetting reinforcing resin sheet. As the preferred embodiment in FIG. 4, the second thermosetting reinforcing resin sheet 3 is formulated such that the tensile modulus is small and the glass transition temperature is low, as in the inner layer 1d of the first thermosetting reinforcing resin sheet 1.

Examples of articles which can be reinforced with the reinforcing adhesive sheet of the present invention include metallic plates, particularly steel plates such as outer panels of automobiles. In addition, the reinforcing adhesive sheet can be applied to various thin metallic plates as used in vehicles and electric appliances (e.g,. a washing machine and a TV set).

In reinforcing with the reinforcing adhesive sheet of the present invention, the adhesive sheet is bonded under pressure to the back of the outer panel in the case of the automotive vehicles and then heated by conventional heating techniques such as a hot air-circulation type heating furnace, an infrared ray heating furnace, and a high frequency-induction heating furnace. The heating process can be carried out simultaneously in the paint baking step of the outer panel in the automobile production line, if desired.

The present invention is described in greater detail by reference to the following non-limiting examples. All parts are by weight.

EXAMPLE 1

An epoxy resin composition of 50 parts of EPIKOTE #828 (a bisphenol A type liquid epoxy resin produced by Yuka Shell Co., Ltd.), 10 parts of EPOMIC R-151 (a flexible epoxy resin produced by Mitsui Petrochemical Epoxy Co., Ltd.), 40 parts of BAILON #500 (a polyester resin produced by Toyo Boseki Co., Ltd.), 3 parts of dicyandiamide (a latent curing agent for epoxy resins, produced by Nippon Carbide Co., Ltd.), 1 part of CURESOLE $C_{11}Z$-CN (a latent curing agent for epoxy resins, produced by Shikoku Kasei Co., Ltd.), 50 parts of talc, and 4 parts of asbestos powder was kneaded in a conventional mixing roll having two or three rollers which can be heated with steam or heater and molded into a sheet having a thickness of 1 mm by means of a straight hydraulic press. In addition, a glass cloth (WE-22C 104/BV produced by Nitto Boseki Co., Ltd.) was laminated on the aboveproduced sheet to produce a thermosetting reinforcing resin sheet.

Ethylene/vinyl acetate copolymer powder (FLOWBACK QH produced by Seitetsu Kagaku Co., LTd.; melting point: 68° C.) was introduced into all the voids of a 10 mm thick urethane foamed body (produced by Inoue MTP Co., Ltd.; apparent density: 0.02 g/ml; open cell body; melting point; 340° C.) in an amount of 120 g/m$^2$ while vibrating the foamed body. The foamed body was placed in an oven maintained at 120° C. to heat it, and then immediately flattened by passing it through metallic rolls to produce a 10 mm thick flattened foamed material which is capable of recovering its original form upon heating.

This flattened material was cut in 10 mm width and provided in the central part of the side of the thermosetting reinforcing resin sheet cut in 50 mm width opposite to the glass cloth side to produce a reinforcing adhesive sheet of the present invention.

The reinforcing adhesive sheet was bonded under pressure to a 0.8 mm thick steel plate in such a manner that the glass cloth of the thermosetting reinforcing resin sheet was exposed to the outside. After bonding, the adhesive sheet was heated for 30 minutes in an atmosphere maintained at 140° C. The ethylene/vinyl acetete copolymer was first melted, and the flattened polyurethane foamed body recovered its original foamed form. Simultaneously, the thermosetting reinforcing resin sheet formed a bead-like projection conforming to the shape of the foamed body, and then was hardened.

The thus-reinforced steel plate was subjected to a strength test according to the method as described hereinafter. The maximum bending stress was 55 kg/50 mm width. The maximum bending stress of the steel plate alone was 9 kg/50 mm width. The maximum bending stress when the thermosetting reinforcing resin sheet alone was bonded under pressure to the steel plate and hardened without the use of the flattened foamed material which can recover its original form was 27 kg/50 mm width. It can be seen that the excellent reinforcing effect of the reinforcing adhesive sheet of the present invention was obtained.

Strength Test

A 50 mm wide test piece was horizontally mounted on two vertical plates (width: 50 mm) placed apart in parallel such that the distance of the top ends thereof was 100 mm, the top end having a reversed U-shaped cross section of a radius of curvature of 5 mm. Another vertical plate (width: 50 mm), the top end having a reversed U-shaped cross section of a radius of curvature of 5 mm, was centrally placed on the test piece, and load was applied to measure the maximum bending strength (kg/50 mm width).

EXAMPLE 2

An epoxy resin composition of 50 parts of EPIKOTE #828 (the same as used in Example 1), 35 parts of EPIKOTE #1002 (a bisphenol A type solid epoxy resin produced by Yuka Shell Co., Ltd.), 15 parts of BAILON #500 (the same as used in Example 1), 0.8 part of CURESOLE C$_{11}$Z (the same as used in Example 1), 5 parts of dicyandiamine (the same as used in Example 1), 50 parts of talc, 10 parts of clay powder, and 3 parts of vinylon short fibers was kneaded in the conventional mixing roll and molded into a 0.5 mm thick sheet by means of a straight hydraulic press. In addition, a glass cloth (WE-22D 104/BV produced by Nitto Boseki Co., Ltd.) was laminated on the sheet to produce an outer layer of a thermosetting reinforcing resin sheet in an unhardened state.

A mixture of 80 parts of EPIKOTE #871 (a dimer acid-modified epoxy resin produced by Yuka Shell Co., Ltd.), 5 parts of EPIKOTE #1002 (the same as used above), 5 parts of EPIKOTE #828 (the same as used above), and 10 parts of HYKER CTBN 1300×8 (BF, nitrile rubber produced by Goodrich Co., Ltd.) was melted in a mixer. To 100 parts of the resulting composition were added 1 part of CURESOLE C$_{11}$Z (the same as used in Example 1), 5 parts of dicyandiamine (the same as used in Example 1), 15 parts of clay powder, and 3 parts of vinylon short fibers. The thus-prepared mixture was kneaded in the conventional mixing roll and molded into a sheet by means of a straight hydraulic press to produce a 0.8 mm thick inner layer of a thermosetting reinforcing resin sheet in an unhardened state.

The above-produced inner and outer layers were bonded together to produce a thermosetting reinforcing resin sheet of the two-layer structure. The tensile modulus after hardening by heating was 95 kg/mm$^2$ for the outer layer, and 3.0 kg/mm$^2$ for the inner layer. The glass transition temperature after hardening by heating was 110° C. for the outer layer, and 50° C. for the inner layer. This hardening was carried out at 120° C. for 90 minutes.

The same 10 mm thick urethane foamed body as used in Example 1 was impregnated with a 7 wt% methyl ethyl ketone solution of EPIKOTE #1001 (bisphenol A type epoxy resin produced by Yuka Shell Co., Ltd.; melting point: 64°-74° C.) followed by removal of the methyl ethyl ketone. In this manner, the epoxy resin was introduced into the urethane foamed body in an amount of 150 g/m$^2$. This foamed body was flattened to produce a 1 mm thick flattened foamed body which was capable of recovering its original form. When the flattened material was placed in an oven maintained at 90° C., the material recovered its original form in 1 to 2 minutes.

The flattened material was cut in 10 mm width and bonded under pressure to the central part of the 50 mm wide inner layer of the above two-layer structure thermosetting reinforcing resin sheet to produce a reinforcing adhesive sheet.

This adhesive sheet was bonded in the same manner as in Example 1 to a 0.8 mm thick steel plate in such a manner that the inner layer of the thermosetting reinforcing resin sheet was brought into contact with the steel plate. The assembly was heated at 120° C. for 90 minutes, thereby allowing the flattened material to recover its original form and hardening the sheet. The strength of the above-reinforced steel plate was 55 kg/50 mm width and the reinforcing effect of the adhesive sheet was very satisfactory. In addition, the sink (deformation) phenomenon of the steel plate was visually examined, but not observed at all. The appearance was good.

EXAMPLE 3

A polyester film (LUMILAR #9 produced by Toray Co., Ltd.) was bonded to the side of the same thermosetting reinforcing resin sheet as produced in Example 1 opposite to the glass cloth side. In addition, the same flattened material as produced in Example 1 was bonded under pressure to the side of the sheet opposite to the polyester film side to produce a reinforcing adhesive sheet of the present invention.

The adhesive sheet was bonded under pressure to a 0.8 mm thick steel plate in such a manner that the polyester film was exposed to the outside. This operation was carried out while unwinding the reinforcing adhesive sheet which had been wound up. The polyester film did not cause problems of adhesion between layers and contamination by the attachment of the resin, and the operation could be performed very smoothly.

The above-bonded adhesive sheet was heated at 140° C. for 30 minutes, thereby allowing it to recover its original form and to harden. Thus, a reinforcing layer having a bead-like projection of the thermosetting resin sheet could be formed, and the polyester film bonded well to the sheet. In addition, because of the presence of the protective layer, the appearance, moisture proofness, abrasion resistance, etc., were excellent.

EXAMPLE 4

An epoxy resin composition of 50 parts of EPIKOTE #828 (the same as used above), 35 parts of EPIKOTE #1002 (the same as used above), 15 parts of BAILON #500 (the same as used above), 0.3 part of CURESOLE 2MZ-AZINE (a latent curing agent for epoxy resins, produced by Shikoku Kasei Co., Ltd.), 50 parts of dicyandiamide (the same as used above), 10 parts of clay powder, and 3 parts of vinylon short fibers was kneaded in the conventional mixing roll and molded into a 0.5 mm thick sheet by means of a straight hydraulic press. In addition, a glass cloth (WE-22D 104/BV produced by Nitto Boseki Co., Ltd.) was laiminated on the sheet to produce an outer layer of a first thermosetting reinforcing resin sheet in an unhardened state.

A mixture of 80 parts of EPIKOTE #871 (the same as used above), 5 parts of EPIKOTE #1002 (the same as used above), 5 parts of EPIKOTE #828, and 10 parts of HYKER CTBN 1300×8 (the same as used above) was melted in a mixer. To 100 parts of the resulting composition were added 0.3 part of CURESOLE 2MZ-AZINE (the same as used above), 5 parts of dicyandiamide, 75 parts of graphite (PB-3, scale-shaped graphite produced by Nakagoshi Kokuen Seizosho), 15 parts of clay powder, and 3 parts of vinylon short fibers. The resulting mixture was kneaded in the conventional mixing roll and then molded into a sheet by means of a straight hydraulic press to produce a 0.4 mm thick inner layer of a first thermosetting reinforcing resin sheet in an unhardened state.

This inner layer was bonded to the above-produced outer layer to produce the first thermosetting reinforcing resin sheet. The tensile modulus after hardening by heating was 95 kg/mm$^2$ for the outer layer, and 4.0 kg/mm$^2$ for the inner layer. The glass transition temperature was 110° C. for the outer layer, and 50° C. for the inner layer. This hardening process was carried out by heating at 150° C. for 60 minutes.

The first thermosetting reinforcing resin sheet of the two-layer structure was cut in 50 mm width. The flattened foamed material produced in Example 1, which had been cut in 10 mm width, was bonded to the inner layer of the first thermosetting reinforcing resin sheet. In addition, a second thermosetting reinforcing resin sheet which had been produced by molding the same resin composition as used in the production of the inner layer into a 0.4 mm thick sheet by means of a straight hydraulic press, was bonded to the flattened material to produce a reinforcing adhesive sheet.

This reinforcing adhesive sheet was bonded under pressure to a 0.8 mm thick steel plate in such a manner that the second thermosetting reinforcing resin sheet was brought into contact with the steel plate. After this bonding, an electrodeposition coating was applied, and the reinforcing adhesive sheet was heated for 30 minutes in an atmosphere maintained at 180° C., thereby allowing the flattened material to recover its original form and the sheets to harden. The thus-reinforced steel plates was subjected to the same strength test as described above. The maximum bending stress was 58 kg/50 mm width. In view of the fact that the maximum bending stress of the steel plate alone was 9 kg/50 mm width, it can be seen that the reinforcing effect of the reinforcing adhesive sheet of the present invention is excellent.

The above test piece was subjected to a rust test using a brine spraying tester (Model ST-JR produced by Toyo Rika Kogyo Co., Ltd.) according to the method of salt spray testing as defined in JIS Z2371. It was found that electro-deposition coating in the boundary between the steel plate and the reinforcing adhesive sheet was good, and that development of rust was not observed even after the brine was applied for 500 hours.

While the invention has been described in detail and with reference to specific embodiments thereof, it will be apparent to one skilled in the art that various changes and modifications can be made therein without departing from the spirit and scope thereof.

What is claimed is:

1. A reinforcing adhesive sheet comprising:
   a thermosetting reinforcing resin sheet containing a reinforcing material in an unhardened or semi-hardened state; and
   a bead-forming material provided on the thermosetting reinforcing resin sheet, said bead-forming material being narrower than the thermosetting reinforcing resin sheet and forming a bead-like projection prior to hardening the thermosetting reinforcing resin sheet, wherein said bead-forming material is a flattened material produced by flattening an elastic foamed body containing a holding agent in voids thereof, the flattened form being maintained by the holding agent, and said bead-forming material is capable of recovering its original foamed form upon heating wherein the thermosetting reinforcing resin sheet comprises a first thermosetting reinforcing resin sheet and a second thermosetting reinforcing resin sheet, and the bead-forming material is interposed between the first and second thermosetting reinforcing resin sheets.

2. A sheet as in claim 1, wherein the tensile modulus of the first thermosetting reinforcing resin sheet after hardening by heating is greater than that of the second thermosetting reinforcing resin sheet, and the glass transition temperature of the first thermosetting reinforcing resin sheet after hardening by heating is higher than that of the second thermosetting reinforcing resin sheet.

3. A sheet as in claim 1, wherein at least the second thermosetting resin sheet is an electrically conductive sheet.

4. A reinforcing adhesive sheet as in claim 1, wherein the holding agent has a melting point or softening point in the range of from 40° to 140° C.

5. A reinforcing adhesive sheet as in claim 4, wherein the holding agent is a thermosetting resin selected from the group consisting of an epoxy resin, a phenol resin, and a polyester resin, or a thermoplastic resin selected from the group consisting of polyethylene, polypropylene, polyamide, and polybutyral.

6. A reinforcing adhesive sheet as in claim 1, wherein the holding agent is present in the foamed material in an amount of from about 25 to 75 wt% based on the total amount of the elastic foamed body and the holding agent.

7. A reinforcing adhesive sheet as in claim 4, wherein the holding agent is present in the foamed material in an amount of from about 25 to 75 wt% based on the total amount of the elastic foamed body and the holding agent.

8. A reinforcing adhesive sheet as in claim 5, wherein the holding agent is present in the foamed material in an amount of from about 25 to 75 wt% based on the total amount of the elastic foamed body and the holding agent.

* * * * *